May 25, 1965  W. H. LORTZ  3,185,234
COUNTERBALANCING WEIGHING INSTRUMENT
Filed June 11, 1962  3 Sheets-Sheet 1

INVENTOR.
WILLIAM LORTZ
BY *Norman N. Huff*

May 25, 1965 W. H. LORTZ 3,185,234
COUNTERBALANCING WEIGHING INSTRUMENT
Filed June 11, 1962 3 Sheets-Sheet 2
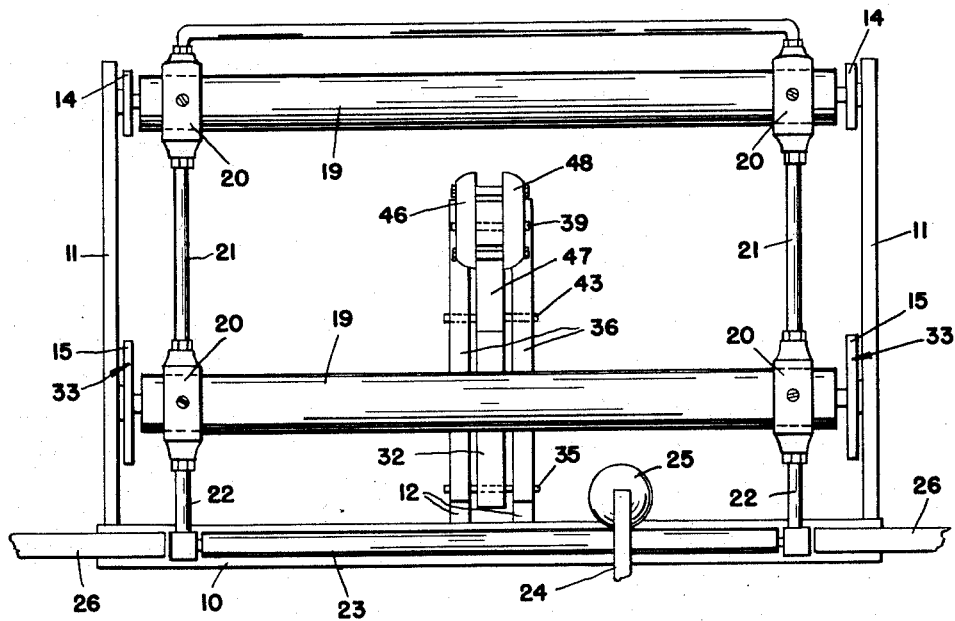
FIG-2
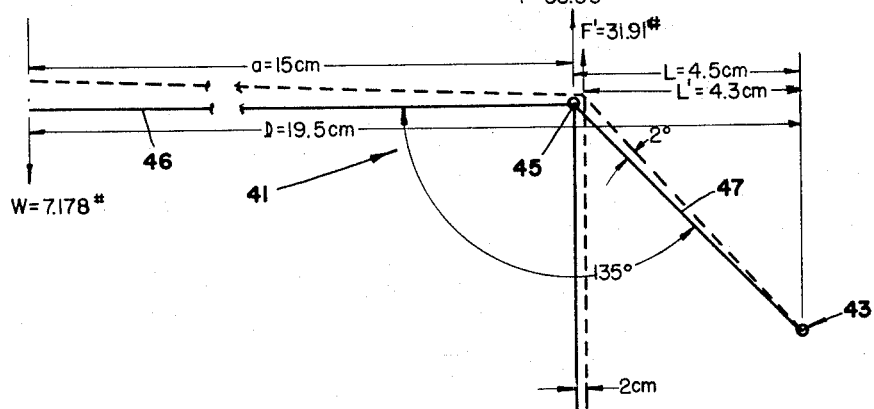
FIG-4
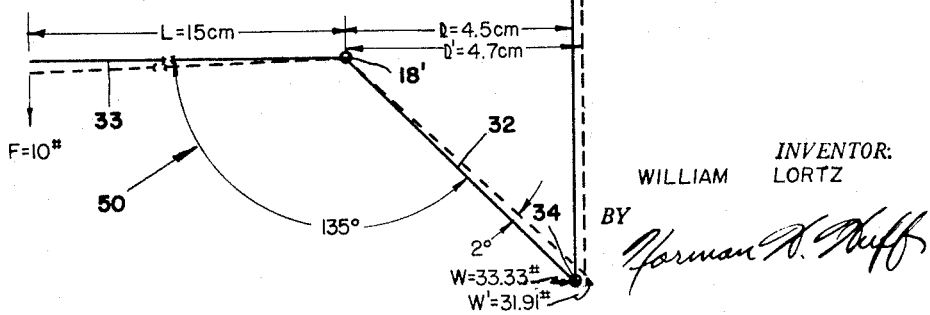
INVENTOR:
WILLIAM LORTZ
BY May 25, 1965  W. H. LORTZ  3,185,234
COUNTERBALANCING WEIGHING INSTRUMENT
Filed June 11, 1962  3 Sheets-Sheet 3

INVENTOR.
WILLIAM LORTZ
BY
Norman N. Hoff

United States Patent Office 3,185,234
Patented May 25, 1965

3,185,234
COUNTERBALANCING WEIGHING
INSTRUMENT
William H. Lortz, Kennewick, Wash., assignor to Baker
Machinery Company, Kennewick, Wash., a corporation
of Washington
Filed June 11, 1962, Ser. No. 201,452
5 Claims. (Cl. 177—246)

The present invention relates broadly to the field of weighing devices and more particularly employs the counterbalancing weight principle in a weighing instrument.

For many years balances employing the principles of a first class lever have been used and, to a large degree, are still used in industrial and other high weight weighing functions.

Conventionally, a first class lever is provided with knife bearings. The power arm of the lever is calibrated and a movable counterweight or poise is carried by the power arm. The article to be weighed is supported by the weight arm disposed on the opposite side of the knife edge pivots from the power arm. Due to wearing of the knife edge pivots, scales of this type are not sufficiently accurate for many commercial uses.

The force exerted on the power arm of a first class lever may be accurately calculated by the formula $$F = \frac{Wl}{L}$$

wherein F equals force (or weight of the object to be weighed); W equals counterweight; L equals length of power arm; and $l$ equals the length of the weight arm. Obviously then, when the axis of the fulcrum shifts, because of wear, even in slight amounts, the accuracy of the weighing instrument is affected.

The present invention is an improvement over the foregoing devices and seeks to overcome the foregoing objections by utilizing a combination of a first class lever and a third class lever, interconnected, so that the wear at the pivot points will be such as to compensate and thus maintain its accuracy over a long period of time.

A further object of the present invention is to provide a counterbalancing weighing instrument, employing interconnected first and third class lever systems, which is extremely sensitive and thus indicates relatively minute weight variations in the thing being weighed.

These and other objects of the present invention will become apparent to those skilled in the art and may be fully understood from the following specification which has reference to the accompanying drawings wherein.

FIGURE 2 is a front elevation;

FIGURE 4 is a line diagram.

Figure 1:
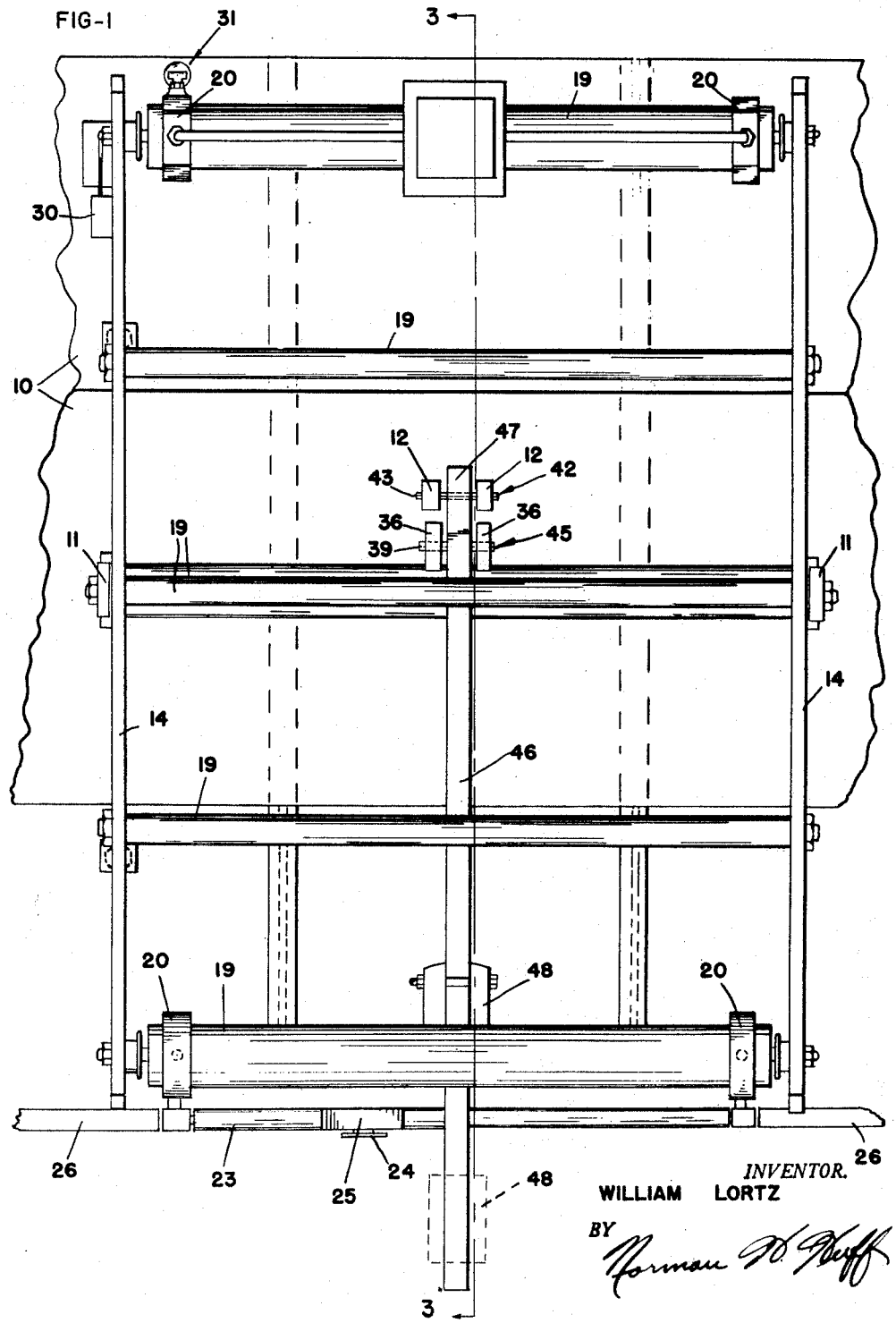
FIGURE 1 is a top plan view of my improved weighing instrument.

The weighing instrument is provided with a support frame, much of which is omitted but is indicated in its entirety by the supporting plate or platform 10 to which is rigidly secured pairs of laterally spaced vertical standards 11—11 and 12—12.

For a specific application, I have provided a hexahedral tilt frame, indicated in its entirety by the numeral 13, which includes upper and lower laterally spaced parallel bars 14—14 and 15—15. The upper and lower pairs of which are pivotally secured together by means of laterally extending parallel rods 16, 17 and 18. In like manner, the lower parallel bars 15 are secured together by laterally extending parallel rods 16, 17 and 18'. The rods 18 and 18', constitute fulcrums over which the parallel bars 14 and 15 pivot or tilt in vertical planes.

Each of the laterally extending parallel rods 16-18 is seen to be a composite of a central rod 16-18 and a spacing sleeve 19.

Collars 20 are secured to the sleeves 19 at the ends of the bars 14 and 15. Connecting rods 21, extend vertically between pairs of upper and lower collars 20, thus providing the hexahedral figure pivoted at the axes of bars 18 and 18', which may tilt, as for example, from the full line position of FIGURE 3 to the dotted line position thereof and still maintain its rhomboidal elevational configuration, when viewed in side elevation.

Depending rods 22 hang from the lowermost collars 20 at one end and support a longitudinal rail 23 which members 22 and 23 are termed a scale, particularly adapted to receive a carriage 24 supported by one or more rollers indicated at 25 by means of which a desired article is transferred from conveying rails 26 onto the scale 23 so that it may be weighed on the weighing instrument.

To prevent excessive tilting movement of the hexahedral frame 13, I provide stops 27 adjustably secured to the base 10.

Figure 3:
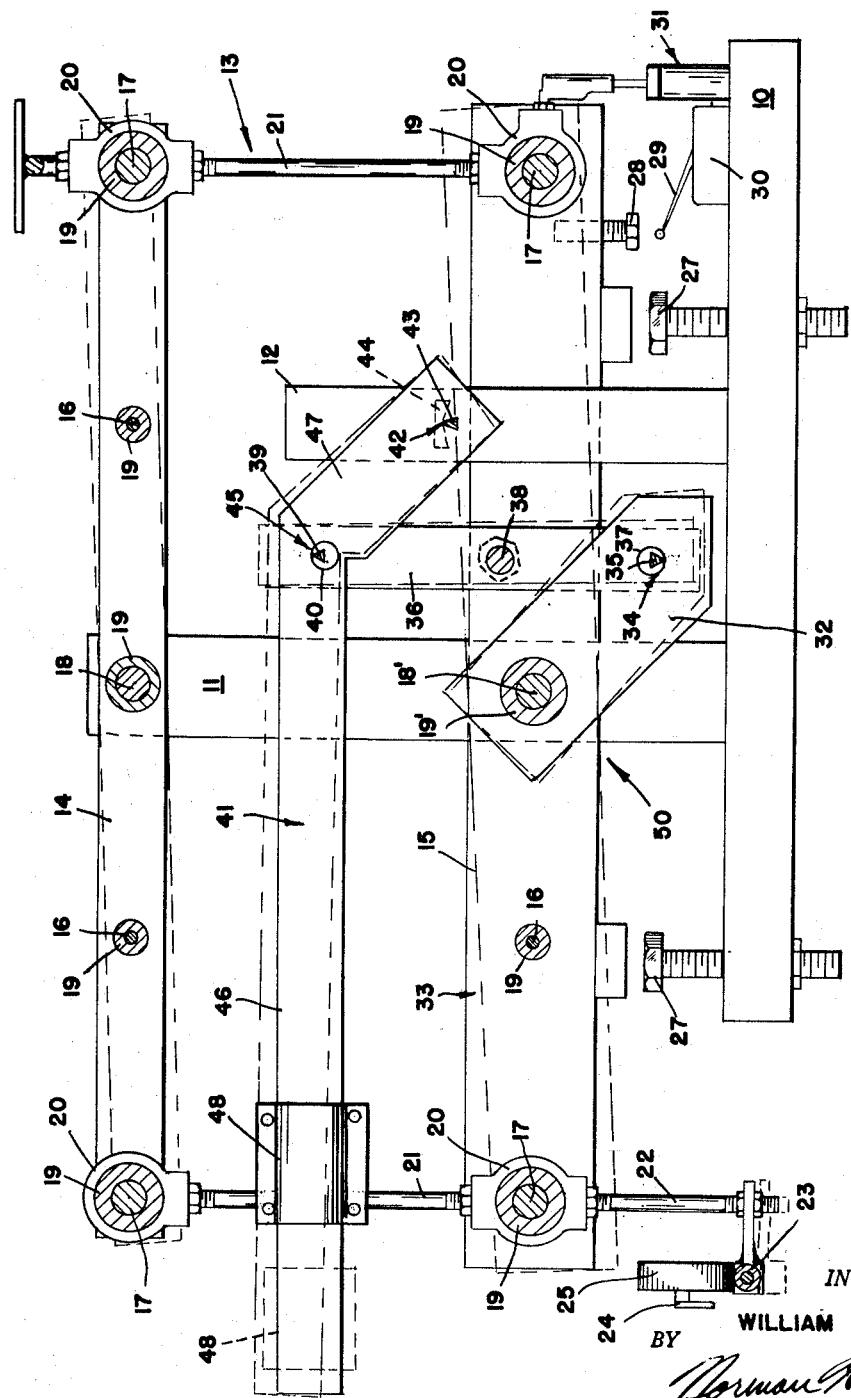
FIGURE 3 is a longitudinal sectional view taken substantially on the plane indicated by line 3—3 of FIGURE 1.

An adjustable presser foot 28 is provided to actuate an actuating arm 29 of a switch 30 to provide audible or visual underweight signalling means when the frame 13 tilts in the direction opposite to that shown by the broken lines of FIGURE 3.

A dash pot assembly 31 is provided to dampen movements of the frame and thus eliminate rough usage and excessive wear on the knife edge pivots, hereinafter to be more fully understood.

The sleeve 19' is rigidly fixed between the bars 15 and a power arm 32 extends radially therefrom. For a simplified explanation of the construction and function, one may consider one of the bars 15 with the power arm 32 as constituting a first class lever over the fulcrum 18'. Then, as viewed in FIGURE 3, the left-hand portion of bar 15 will constitute the weight arm as indicated by the numeral 33. Therefore, when weight or other pressure is applied to the weight arm 33, it causes vertical tilting movement over the fulcrum 18' imparting in a well known fashion, moment at the knife edge pivot 34 of the power arm 32.

The power arm 32 is disposed angularly with respect to the weight arm 33 so that a line extending on the axis of the weight arm 33 will be disposed 135° from a line passing through the axis of fulcrum 18' and the knife edge pivot 34. Thus it will be seen that the power arm 32 is 45° removed from co-axial alignment with the weight arm 33.

The basal member 35 of the knife edge pivot 34 has its ends secured in a unitary bifurcated link 36 which passes on both sides of the power arm 32 and supports the basal member 35 which extends through the aperture 37. A bolt or other satisfactory means 38 unites the bifurcated straps or portions of the link 36.

At its upper end the link 36 is provided with a second basal member 39 which extends through an aperture 40 formed in the third class lever 41 which is pivotally fulcrumed at 42 on the standards 12 by any desired means, here shown to be a basal member 43 and cooperating saddles or seats 44. The basal member 43 is anchored to the lever 41 and the saddles are secured to the standards 12.

The link 36 constitutes means transmitting the moment from the power arm of the first class lever to the third class lever at the knife edge pivot 45.

The portion of lever 41 extending leftwardly in FIGURE 3 from the knife edge pivot 45, is considered to be the weight arm 46 thereof, whereas, the portion extending angularly from the portion 46 is termed the power arm 47 thereof.

The manually adjustable weight or poise 48 is mounted on the arm 46 and may be moved longitudinally thereof and manually fixed at alternate desired locations, as for example, as shown by broken lines of FIGURE 3. As weight, for example, is applied to the scale 23 and causes the first class lever, indicated in its entirety by the numeral 50, to tilt counterclockwise as viewed in FIGURE 3, the moment exerted at the knife edge pivot 34, is transmitted through the link means 36 to the third class lever 41 and endeavors to raise the free end or weight arm 46.

It is to be noted that as the arm 33 is removed downwardly from horizontal, the power arm 32 pivoting at fulcrum 18′ endeavors to move upwardly toward the horizontal thus causing the horizontal distance between the fulcrum 18′ and the knife edge pivot 34 to increase slightly. This same movement causes the transmission linkage 36 to move upwardly and effects a pivotal movement at the fulcrum 42 of the third class lever 41 and this causes the horizontal distance between the knife edge pivot 45 and the knife edge fulcrum 42 to decrease. Well known mathematics of mechanical powers dictate that the upper pressure exerted at the knife edge pivot 45 are effective susbtantially inversely to the movement of the power arm 32 and the power arm 47 away from parallelism.

In the line drawing of FIGURE 4, I provide a graphic illustration of the mathematics involved in the preferred embodiment as previously described.

It is to be understood that preferably the bar 15 and the arm 46 are adjusted to a null at a desired weight setting where they are each perfectly parallel and horizontal. This is accomplished by shifting weight 48 to compensate for the weight of the scale mechanism and carriage 24 plus the weight of the thing to be brought to proper weight, as a bag of produce.

By simple mathematics, it may thus be determined that when the arm 46 pivots downwardly, for example 2° from the horizontal (1′), the downward pressure upon the knife edge pivot 45 equals 31.91 pounds and when it pivots upwardly 2° from horizontal, the downward pressure on the knife edge pivot 45 is 34.88 pounds. With respect to the first class lever, when the arm 33 pivots downwardly 2°, the upward force exerted at knife edge pivot 34 (V) equals 31.91 pounds and when the arm 33 pivots upwardly 2°, the upward force at the knife edge pivot 34 equals 34.88 pounds. Whereas, when the arms 15 and 46 are exactly parallel and horizontal, the knife edge pivot 34 exerts an upward force of 33.33 pounds and the knife edge pivot 45 exerts downward force of 33.33 pounds, thus providing for the adjustment at null.

As the arm 33 is tilted upwardly or clockwise, the efficiency of the lever is increased, because of shortening the distance D (FIGURE 4), by .2 cm. (D′) whereas, simultaneously, the efficiency of the third class lever 41 is decreased by lengthening the distance L′ .2 cm. (L).

The opposite holds true in opposite movement. Since both knife edge pivots 34 and 45 move equal amounts, the wear will be equal and any change will be compensated for by one overcoming the deficiency of the other. The tilt arms 33 and 41 will remain parallel as will also the power arms 32 and 47, when the weighing instrument is adjusted to the null.

Having thus described my invention, I desire to secure by Letters Patent of the United States the following:

1. A counterbalancing weighing instrument, comprising:
   a vertically tiltable first class lever;
   a vertically tiltable third class lever;
   the power arm of each lever being disposed at an angle with respect to its weight arm;
   means interconnecting the said levers for transmitting the moment from the weight arm of said first class lever upwardly to the third class lever;
   means for tilting said first class lever in response to the weight of an article to be weighed; and
   a counterbalancing weight movable to adjusted positions on the weight arm of said third class lever.

2. The invention defined in claim 1 and further characterized by the angles of said levers being equal.

3. The invention defined in claim 2 and further characterized by said angles being 45°.

4. The invention defined in claim 1 wherein the weight arm of the first class lever angles downwardly 135° from its power arm and the power arm of said third class lever angles downwardly 135° from its weight arm; and the means interconnecting the levers is pivotally secured to the weight arm of said first class lever at a point vertically below its pivotal attachment to the third class lever which points of securing are equidistant from their respective fulcra.

5. A counterbalancing weighing instrument, comprising:
   a scale;
   a vertically tiltable first class lever having a fulcrum intermediate its ends and defining a power arm and the weight arm at opposite sides of said fulcrum;
   means transmitting the force effected by weight upon said scale to the power arm of said lever;
   a third class lever having its fulcrum fixed relative to said first class lever fulcrum;
   means transmitting the moment from the weight arm of said first class lever upwardly to the third class lever and being pivotally secured to the lever equidistant from their respective fulcrums; and
   a counterbalancing weight on the power arm of said third class lever.

References Cited by the Examiner

UNITED STATES PATENTS

| 372,538 | 11/87 | James | 177—130 |
| 391,453 | 10/88 | Collins | 177—130 |
| 2,127,063 | 8/38 | Levy et al. | 177—249 X |

FOREIGN PATENTS 516,172  12/39  Great Britain.

ROBERT L. EVANS, *Primary Examiner.*

LEO SMILOW, *Examiner.*